United States Patent
Boudin et al.

(10) Patent No.: US 12,417,248 B2
(45) Date of Patent: Sep. 16, 2025

(54) SYSTEMS AND METHODS OF NETWORK VISUALIZATION

(71) Applicant: Kinaxis Inc., Ottawa (CA)

(72) Inventors: Jeremie Boudin, Ottawa (CA); Rishad Khan, Ottawa (CA); Ivy Blackmore, Ottawa (CA); Andrew Dunbar, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 18/463,343

(22) Filed: Sep. 8, 2023

(65) Prior Publication Data

US 2024/0070200 A1 Feb. 29, 2024

Related U.S. Application Data

(63) Continuation of application No. 16/787,703, filed on Feb. 11, 2020, now Pat. No. 11,868,402.

(60) Provisional application No. 62/913,756, filed on Oct. 11, 2019.

(51) Int. Cl.
| | |
|---|---|
| G06F 16/901 | (2019.01) |
| G06F 16/904 | (2019.01) |
| G06Q 10/08 | (2023.01) |
| G06T 11/20 | (2006.01) |

(52) U.S. Cl.
CPC ........ *G06F 16/9024* (2019.01); *G06F 16/904* (2019.01); *G06Q 10/08* (2013.01); *G06T 11/206* (2013.01)

(58) Field of Classification Search
CPC ... G06F 16/904; G06F 16/9024; G06T 11/206
See application file for complete search history.

(56) References Cited

U.S. PATENT DOCUMENTS

| | | |
|---|---|---|
| 8,312,389 B2 | 11/2012 | Crawford et al. |
| 2003/0018652 A1 | 1/2003 | Heckerman et al. |
| 2011/0148879 A1 | 6/2011 | Moreno |
| 2014/0019879 A1 | 1/2014 | Krajec et al. |
| 2014/0164964 A1 | 6/2014 | Cannon et al. |
| 2015/0109287 A1 | 4/2015 | Grichnik et al. |
| 2015/0156076 A1 | 6/2015 | Matejka et al. |
| 2016/0028580 A1 | 1/2016 | Radivojevic et al. |
| 2017/0163502 A1 | 6/2017 | MacNeil et al. |
| 2017/0300640 A1 | 10/2017 | Gulzar |
| 2017/0308815 A1 | 10/2017 | Najmi et al. |
| 2018/0234310 A1 | 8/2018 | Ingalls et al. |

(Continued)

FOREIGN PATENT DOCUMENTS

JP WO2018159237 A1 12/2019

OTHER PUBLICATIONS

Canadian Patent Application No. 3154379, Office Action dated Mar. 10, 2023.

(Continued)

*Primary Examiner* — Matthew Salvucci
(74) *Attorney, Agent, or Firm* — Ruggiero McAllister & McMahon LLC

(57) ABSTRACT

Systems and methods that provide visualization of networks. Data is input into a table structure that represents any hierarchy of entities, relationships and their attributes. The content of the table is processed to extract the entities, relationships and their attributes. These are turned into nodes, edges and a visual representation of their attributes using color gradients, categorical colors, shapes, thickness, text labels, etc.

12 Claims, 18 Drawing Sheets

(56) References Cited

U.S. PATENT DOCUMENTS

2019/0188213 A1 6/2019 Sexton et al.
2020/0401623 A1 12/2020 Dilts et al.

OTHER PUBLICATIONS

European Patent Application No. 208748509, Extended European Search Report dated Oct. 9, 2023.
International Search Report from related PCT International Application No. PCT/CA2020/051355, transmitted on Jan. 4, 2021.
Japanese Patent Application No. 2022-521631, Office Action dated Apr. 11, 2023—English Translation not available.
Martin, Grandjean, GEPHI—Introduction to Network Analysis and Visualization, Retrieved from the Internet: URL:https://www.martingrandjean.ch/wp-content/uploads/2015/10/Gephi-introduction, 2015, pp. 1-12.
U.S. Appl. No. 16/787,703, Non-Final Office Action dated Jul. 21, 2022.
U.S. Appl. No. 16/787,703, Non-Final office Action dated Mar. 1, 2023.

FIG. 9

| Feature | Description |
|---|---|
| Node descriptions | Two fields of information (ex. Part & Site or Site and Site description) |
| Drag and drop nodes | Allow users to re-shape view by moving nodes around on screen to improve readability. |
| Focus chart | Allow users to right click on a node and focus on the portion of the network that is connected to that node through direct parent/child relationships. |
| Standard node shape icons | A set of high-visibility icons that allows for segmentation based on a string field column |
| Informational tooltips | Add additional text/number information to the tooltips. |
| Drill-to-details | Allow users to drill from nodes to additional details about that node in another worksheet/workbook |
| Node decorators | Allow authors to define the number of boolean values that apply a colored node decorator to all nodes understanding of the network. |
| Segmentation swim lanes | Allow authors to define swim lanes based on the level of each tier of the network. The description of each lane is defined by a string column. |
| Node color | Colors can define categorical segmentation of the network, or represent a KPI % value using a normalized color gradient. |
| Link color | Allow authors/users to defined the color of the links based on a KPI % value or a segmented link type |
| Link thickness | Allow authors/users to define the width of the link between nodes based on a quantity column |
| Link label | A numerical label on each link to provide information about quantity, lead time, etc. |

FIG. 11

SYSTEMS AND METHODS OF NETWORK VISUALIZATION

CROSS-REFERENCE TO RELATED APPLICATIONS

This application is a continuation of U.S. patent application Ser. No. 16/787,703, filed Feb. 11, 2020, which claims priority on U.S. patent application Ser. 62/913,756, filed Oct. 11, 2019, the entirety of each of which is hereby incorporated by reference.

BACKGROUND

Supply chain data is complex and large, comprising a large number of entities. Often, there are complex relationships between these entities, as well as hierarchies among the entities. Such data is input in tabular form, consisting of rows and columns, making it difficult to ascertain these relationships and hierarchies. Often, such tabular form is not appropriate for data associated with a network. It also makes analysis of hotspots in the supply chain complex and cumbersome—thereby leading to potentially disruptive delays.

BRIEF SUMMARY

The present disclosure relates to systems and methods that provide a visualization of data associated with a network. Rather than representing data in terms of tables, rows and columns, the data is represented as nodes and edges (i.e. relationships between entities). Such a representation of the data is valuable, since it provides a view of the underlying structure of associations between entities. This allows for a deeper analysis of networks, identification of problematic issues, and a quick path to finding root causes of problems.

A table structure is defined, that can represent, in a generic way, any hierarchy of entities and their relationships. A user may fit data into such a tabular structure to visualize it as a network.

The content of the table can then be processed to extract the entities, relationships and their attributes. That is, attributes refer to information attached to entities and relationships, such as qualitative or quantitative measurements. These can then be turned into nodes, edges and a visual representation of their attributes using color gradients, categorical colors, shapes, thickness, text labels, etc. The nodes may be positioned on a canvas using, for example, a hierarchical layout algorithm with level constraints.

The output of the visualization helps a user to analyze the data in a manner that makes it more accessible, understandable and usable (than using a data table). The spatial representation of the network and visual representation of the metrics can reveal insight into the data at multiple levels of detail (in ways that tabular data cannot). This may help the user to understand causality and take appropriate decisions quickly—in fact, much faster than by analyzing the data in a tabular form. The customizability of the data mapping allows a user to pick the relevant metrics for a given use-case, and to compare them quickly.

The methods and systems of network visualization disclosed herein, have applications in many fields where a hierarchical structure is present. For example, network visualization can be applied to organizational structure, production structure, a transportation network, a supply chain network, project planning, etc. In addition, business decisions can be made quickly, based on a network visualization of the business case. Actions can be made, based on network visualization. Network visualization allows for rapid analysis, for example, of the reason why a customer receives a late order in a supply chain.

In some embodiments, methods and systems of network visualization can be applied to supply chain management, thereby providing a way for supply chain practitioners to visualize entities and relationships between entities that can be found in supply chain data. In some embodiments, such visualization can be in the form of a hierarchy or tree diagram. Non-limiting examples include product structure, product families, company structure, distribution network, decision tree, etc. Network visualization can reveal underlying structures of associations between entities and surface relevant information pertaining to the entities and their relationships (ex: KPIs, metrics, category, etc.).

Such a visualization can provide a supply chain visibility of, for example, network and BOM (bill of materials) structure, health of the supply chain and fulfillment of demand orders. It allows users to probe and analyze various networks, to identify issues and makes it easier to find their root-cause. For example, "hot spots" in a supply chain can be detected and analyzed faster, by using network visualization rather than analysis of tabular data. Furthermore, a user can connect strategy to execution through visual management of Key Performance Indicators (KPIs). A user can make better decisions with an improved understanding of complex relationships within a supply chain network. Network visualization of a supply chain also offers new ways to manage the supply chain, that could not have been easily deduced from data represented in spreadsheets. Problem detection, investigation, evaluation and resolution is faster using network visualization (where a network graph model is used) than by use of a spreadsheet-based or tabular visualization.

In one aspect, there is provided a computer-implemented method for network visualization of data, the method comprising: creating, by a graph data module, a graph data model of the data; creating, by a qualitative data module, one or more groups based on qualitative data mappings; creating, by a quantitative data module, one or more statistical summaries based on quantitative data mappings; computing, by a visual representation module, visual representations of the one or more quantitative mappings and the one or more qualitative mappings; establishing, by a layout module, a plurality of node positions based on their relationships and level constraints, the plurality of node positions appended to the graph data model; creating, by a swim lane module, swim lanes based on level constraints and swim lane labels; and rendering, by a graph visualization module, a graph visualization of the data.

In another aspect, there is provided a non-transitory computer-readable storage medium, the computer-readable storage medium including instructions that when executed by a computer, cause the computer to: create, by a graph data module, a graph data model of the data; create, by a qualitative data module, one or more groups based on qualitative data mappings; create by a quantitative data module, one or more statistical summaries based on quantitative data mappings; compute, by a visual representation module, visual representations of the one or more quantitative mappings and the one or more qualitative mappings; establish, by a layout module, a plurality of node positions based on relationships between the nodes and level constraints, the plurality of node positions appended to the graph data model; create, by a swim lane module, swim lanes based on level constraints and swim lane labels; and render, by a graph visualization module, a graph visualization of the data.

In another aspect, there is provided a computing system, the computing system comprising: a processor; and a memory storing instructions that, when executed by the processor, configure the apparatus to: create, by a graph data module, a graph data model of the data; create, by a qualitative data module, one or more groups based on qualitative data mappings; create, by a quantitative data module, one or more statistical summaries based on quantitative data mappings; compute, by a visual representation module, visual representations of the one or more quantitative mappings and the one or more qualitative mappings; establish, by a layout module, a plurality of node positions based on the visual representations, the plurality of node positions appended to the graph data model; create, by a swim lane module, swim lanes based on level constraints and swim lane labels; and render, by a graph visualization module, a graph visualization of the data.

In some embodiments, a network visualization can provide a way for supply chain practitioners to visualize entities and relationships between entities that can be found in their supply chain data, in the form of a network diagram (or graph). Included in a network/graph is the subset of hierarchy or tree diagrams, which are non-directed and without cycles. In some embodiments, a base structure of the network visualization is a hierarchy. Examples include (but are not limited to): product structure, product families, company structure, distribution network, decision tree, etc.

Output of network visualization can help a user analyze and reason about the data; thereby making the data more accessible, understandable and usable. The spatial representation of the network and visual representation of the metrics can reveal information and relationships about data at multiple levels of detail. Furthermore, it can help a user to understand causality and take appropriate decisions quickly. The customizability of the data mapping can allow a user to pick the relevant metrics for a given use-case, and to compare them.

In some embodiments, network visualization can reveal underlying structures of associations between entities and surface relevant information pertaining to the entities and their relationships (ex: KPIs, metrics, category, etc.). This allows users to probe and analyze various networks, to identify issues and make it easier to find their root-cause.

Disclosed herein is a visualization framework that allows a dynamic visualization to access data from a table; and store and customize settings and data mappings. A dynamic visualization can take a table as input, parse it and process it to render a visual representation of the data. Visualizations that rely on this framework may be Web-based and rely on a Web browser to render the visualization. Visualizations may rely on external libraries (visualization libraries, layout algorithms, UI frameworks, etc.).

In some embodiments, a visualization framework may give access to data from a table. A dynamic visualization can take a table as input, parse it and process it to render a visual representation of the data. Network visualization takes a table representing a finite graph for use in computer programs as input and parses it to create a graph data model (consisting in a list of source-target edges, with optional node attributes and edge attributes). In some embodiments, the table can be defined in any file format suited for the representation of tabular data, such as CSV, TSV, ODS, XLS, JSON, etc. In some embodiments, the network visualization comprises: a module that can process qualitative data mappings; a module that can process quantitative data mappings; a module that can generate visual representations of data mappings on nodes and edges; and a module that can create swim lanes based on level constraints.

Network visualization can be applied to any hierarchical structure. Non-limiting examples include organizational structures, production structures, transportation networks, project planning, etc.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 illustrates an example data table in accordance with one embodiment of network visualization.

FIG. 11 illustrates an example of features in accordance with one embodiment of network visualization.

DETAILED DESCRIPTION

The present disclosure provides systems and methods to visualize complex relationships within data that is typically stored in, for example, spreadsheets. The data can include any type of hierarchical structure (e.g. Parent/child relationship).

In some embodiments, the network visualization relies on a visualization framework that allows a dynamic visualization to access data from a table and customize data mappings; a graph visualization library and a hierarchical layout algorithm; and a web browser to render the visualization.

Figure 1:
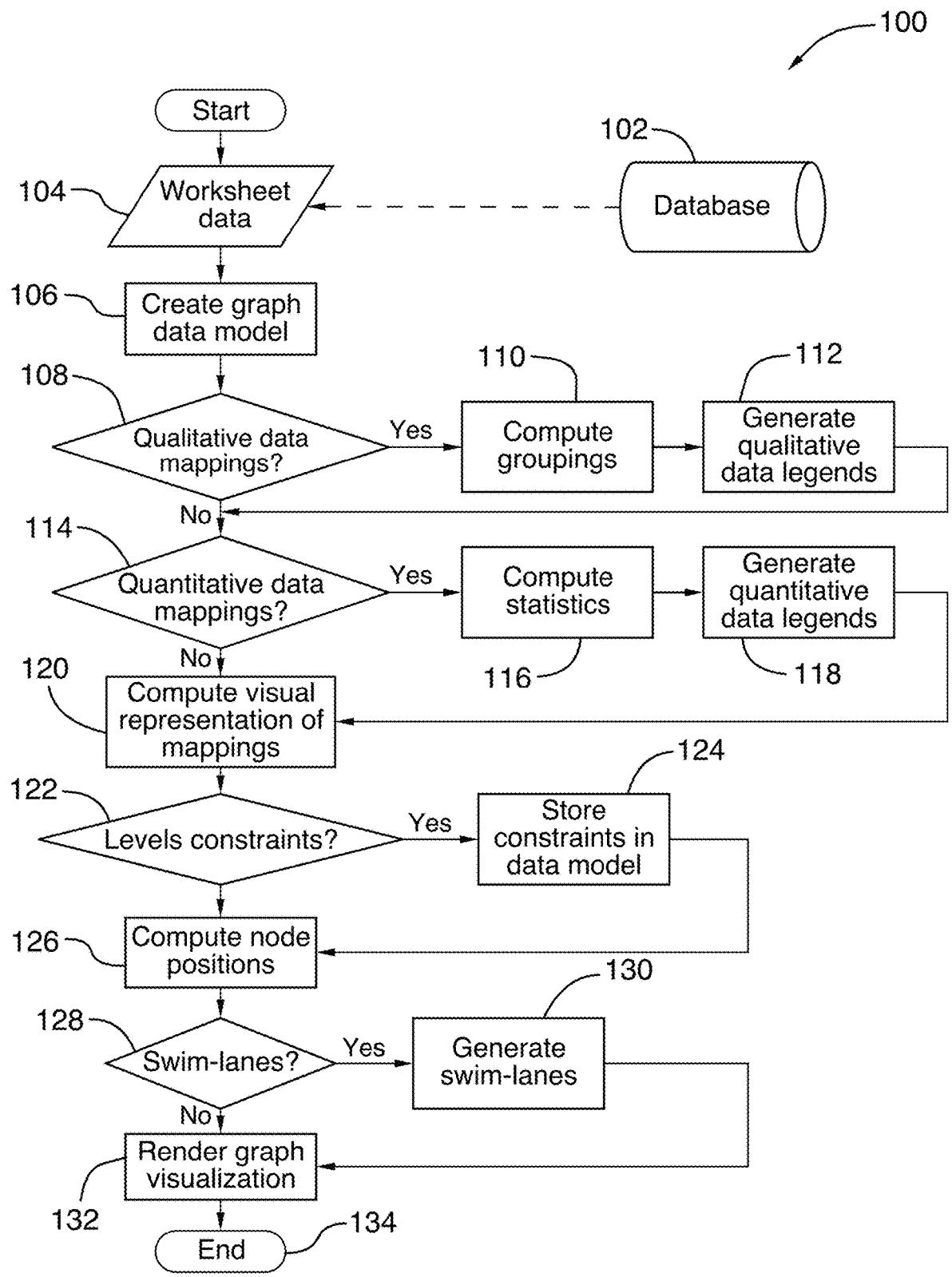
FIG. 1 illustrates a flowchart in accordance with an embodiment of a network visualization.

FIG. 1 illustrates a flowchart 100 in accordance with an embodiment of a network visualization.

In some embodiments, the network visualization takes as input: a table structure/format that can represent a finite graph for use in one or more computer programs; generates a graph data model comprising a list of source-target edges, with optional node attributes and edge attributes. In some embodiments, the network visualization comprises: a module that processes qualitative data mappings; a module that processes quantitative data mappings; a module that generates visual representations of data mappings of nodes and edges; and a module that creates swim-lanes based on level constraints.

In some embodiments of the network visualization, a user authors a table that conforms to a pre-scribed format. A visualization framework allows the user to customize the mappings (choose which data columns are represented on the visualization) and makes this data accessible to the network visualization. The network visualization can turn the table data into a graph data model (nodes, edges, attributes). Data processing modules compute groupings and statistics of the data mappings; the node positioning is computed by a layout algorithm and appended to the graph data model. A swim-lane module uses the layout output and level information provided by the user to group nodes on dedicated bands. The graph data model can then be consumed by a graph visualization library to create a dynamic graph using, for example, Web technologies. The dynamic graph can be rendered on a screen by a Web browser.

A database 102 is used to provide data, which is placed into a format of worksheet data 104. This can then be used to create a graph data model 106, which can store optional qualitative and quantitative data for nodes and edges. Groupings 110 can be computed by summarizing one or more qualitative data mappings 108 and displayed in a qualitative data legends 112. A mapping is a column that the network visualization receives as input. In some embodiments, qualitative data is defined as measures of types or category, that may be represented by a name, symbol, or a code. Examples: demand type, supply type, site, site type, etc.

Statistics 116 can be computed based on one or more quantitative data mappings 114, help generate one or more quantitative data legends 118. Following the generation of each type of data legend, a visual representation of mappings 120 is computed. In some embodiments, quantitative data is defined as measures of values or counts expressed as numbers. In some embodiments, quantitative data includes exception count, demand quantity, supply quantity, days of lateness, etc.

In some embodiments, a user may choose to select qualitative data mappings 108 and/or quantitative data mappings 114. In some embodiments, a user may choose not to create either qualitative or quantitative mappings.

Next, the system processes any level constraints 122 in the data. A level constraint allows a user to define which level a particular node should appear. These constraints 124 are stored in the data model. In some embodiments, there are no level constraints.

Node positions 126 are then computed by a layout algorithm, and placed on a canvas. The layout algorithm lays out the nodes based on their relationships and dimensions, and optionally level constraints (if provided).

The system then checks to see if the user has prescribed swim-lanes 128, and generates swim-lanes 130 accordingly.

Finally, graph visualization 132 is rendered, representing quantitative and qualitative mappings (if selected), level constraints (if present) and swim lanes (if selected). This visualization provides a visual representation of the relationship between various elements of the raw data, thereby allowing a user quick analysis and quick identification of problematic issues. The flowchart 100 reaches the end at 134.

Figure 2:
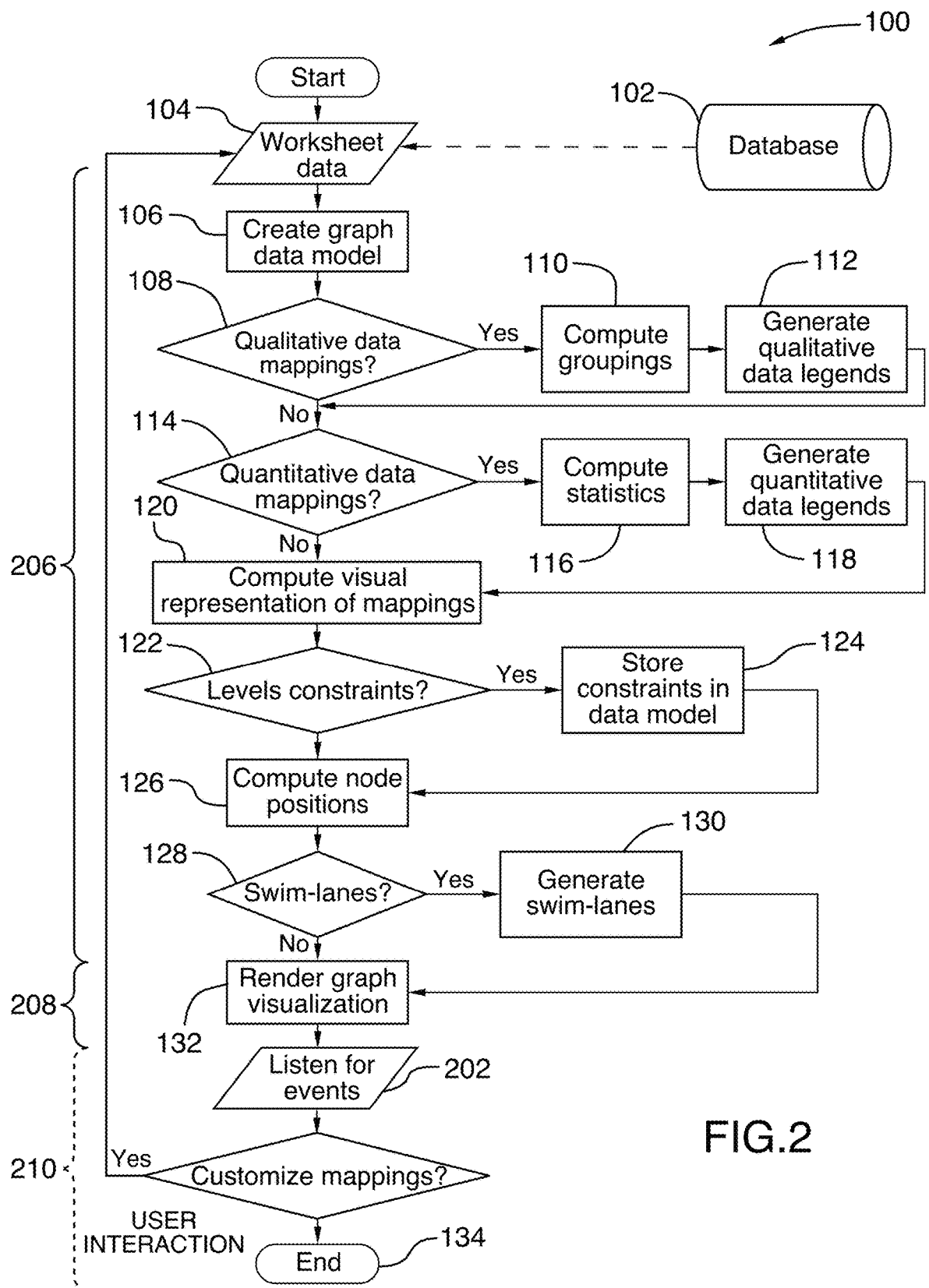
FIG. 2 illustrates a flowchart in accordance with another embodiment of a network visualization.

FIG. 2 illustrates a flowchart 200 in accordance with an embodiment of a network visualization.

Flowchart 200 is identical to flowchart 100 from steps 102-132 (i.e. Data processing 206 and visual rendering of the graph data model 208). Flowchart 200 includes an additional feature which includes user interaction 210 with the visualized data. Once graph visualization 132 has been rendered, the system listens for events 202, in which the network visualization is manipulated by the user via a user interface. The user can further customize mappings 204, in which case, the original data is altered, and the entire process is repeated.

In some embodiments, customization of mappings 204 allows a user to select one or more specific columns in the original worksheet data 104 and map it to a specific node or edge attribute. For example, where network visualization is used for supply chain analysis, customization of mappings 204 allows a user to select which Key Performance Indicator (KPI) to visualize. In some embodiments, user interaction 210 includes drilling into details of the nodes/edges presented in the visualization.

Figure 3:
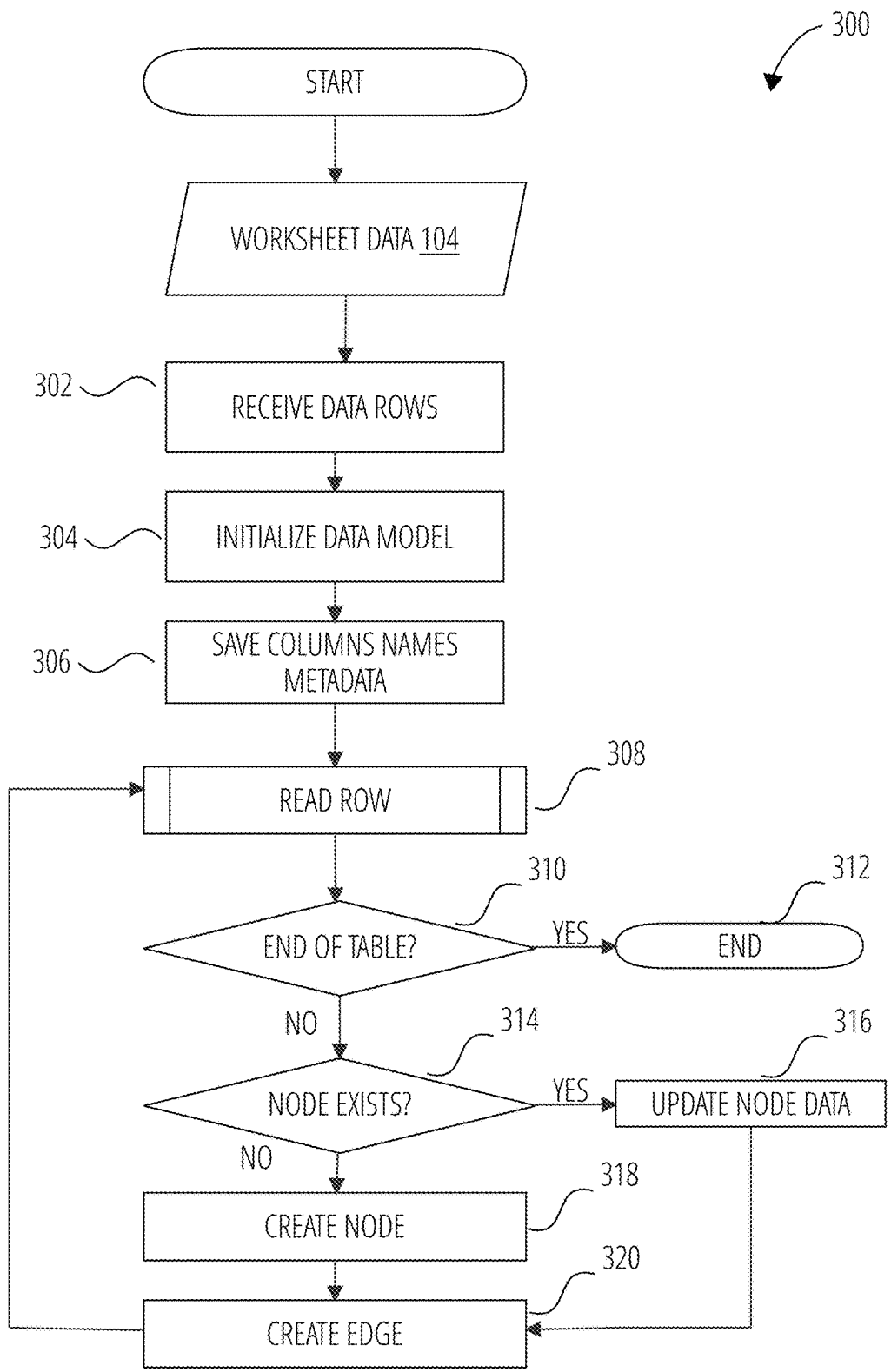
FIG. 3 illustrates a flowchart for creating a graph data model in accordance with one embodiment of network visualization.

FIG. 3 illustrates a flowchart 300 for creating a graph data model in accordance with one embodiment.

In FIG. 3, data rows 302 are received from a worksheet data 104. A data model 304 is initialized, and columns names metadata 306 is saved. A row 308 is read. If this is the last row of the table 310, then the program comes to an end 312. Otherwise, it continues and determines if a node 314 already exists. If an identified node 314 already exists, then node data 316 is updated. Otherwise a node 318 is created. Once the status of the node is established, it is followed by creation of an edge 320. The process is then repeated by going to the next row in the table, until there are no more rows to read.

Figure 4:
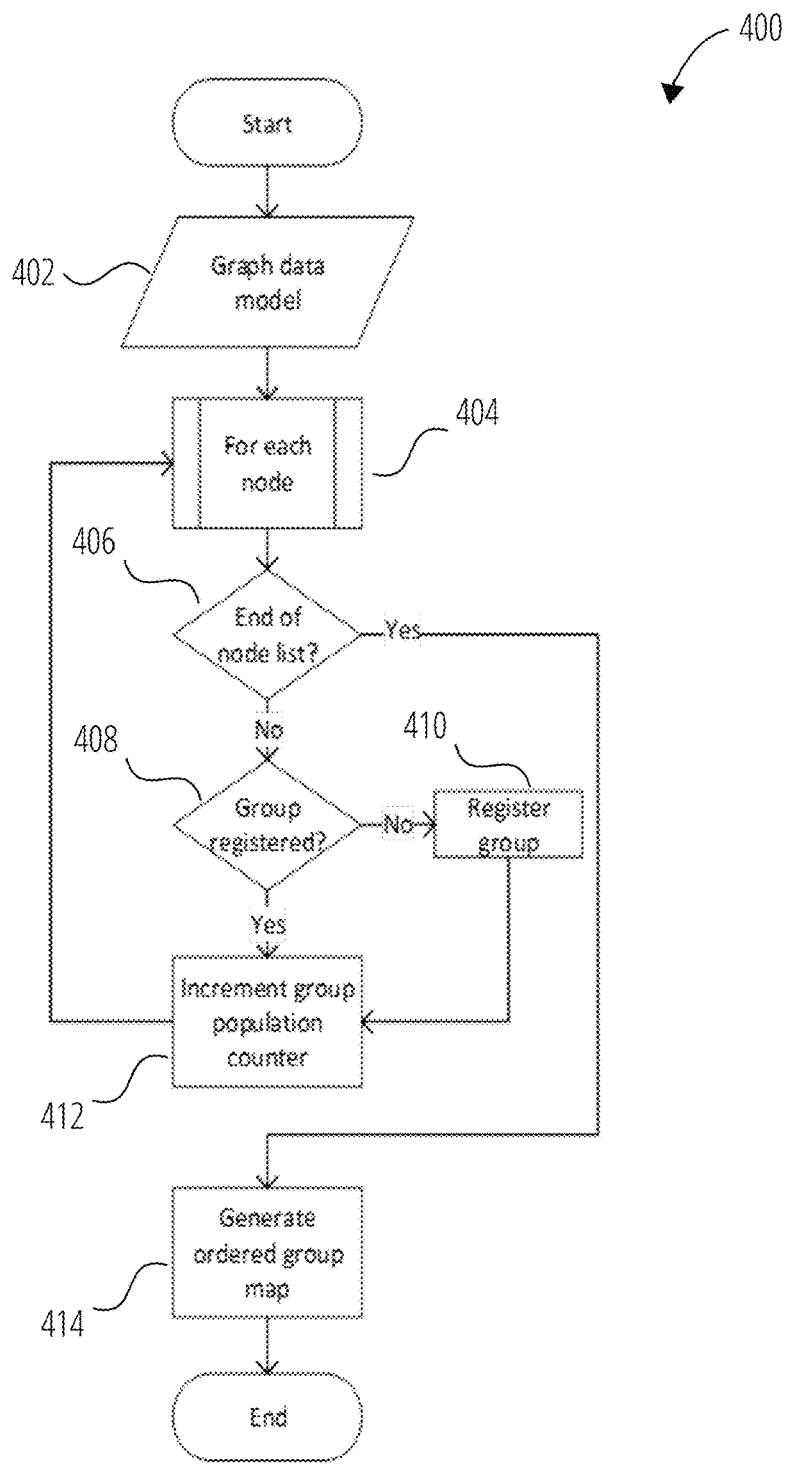
FIG. 4 illustrates a flow chart 400 for computing groups in accordance with one embodiment of network visualization.

FIG. 4 illustrates a flow chart 400 for computing groups in accordance with one embodiment.

A network graph data model 402 is used to provide a list of nodes, edges and attributes. In some embodiments, the graph data model (built from the worksheet data) is stored in memory; the worksheet data contains information about each node and each edge. For example, information for each node can include: node ID, label, tooltip, level, group, type, swim lane, etc. For example, where a network visualization is used for a supply chain network, this can include the name of a part in the supply chain, the name of a site in the supply chain, etc.

Each node 404 in the list is processed sequentially. If the node list 406 has not been exhausted, the group associated with the node is examined to see if the group 408 is registered. If not, then the group is registered 410, and the group population counter 412 is incremented, and the next node is processed. If the group has already been registered, then the group population counter 412 is incremented.

Once the node list 406 is exhausted, an ordered group map 414 is generated and this subroutine then ends. In some embodiments, the groups may be ordered by population.

Figure 5:
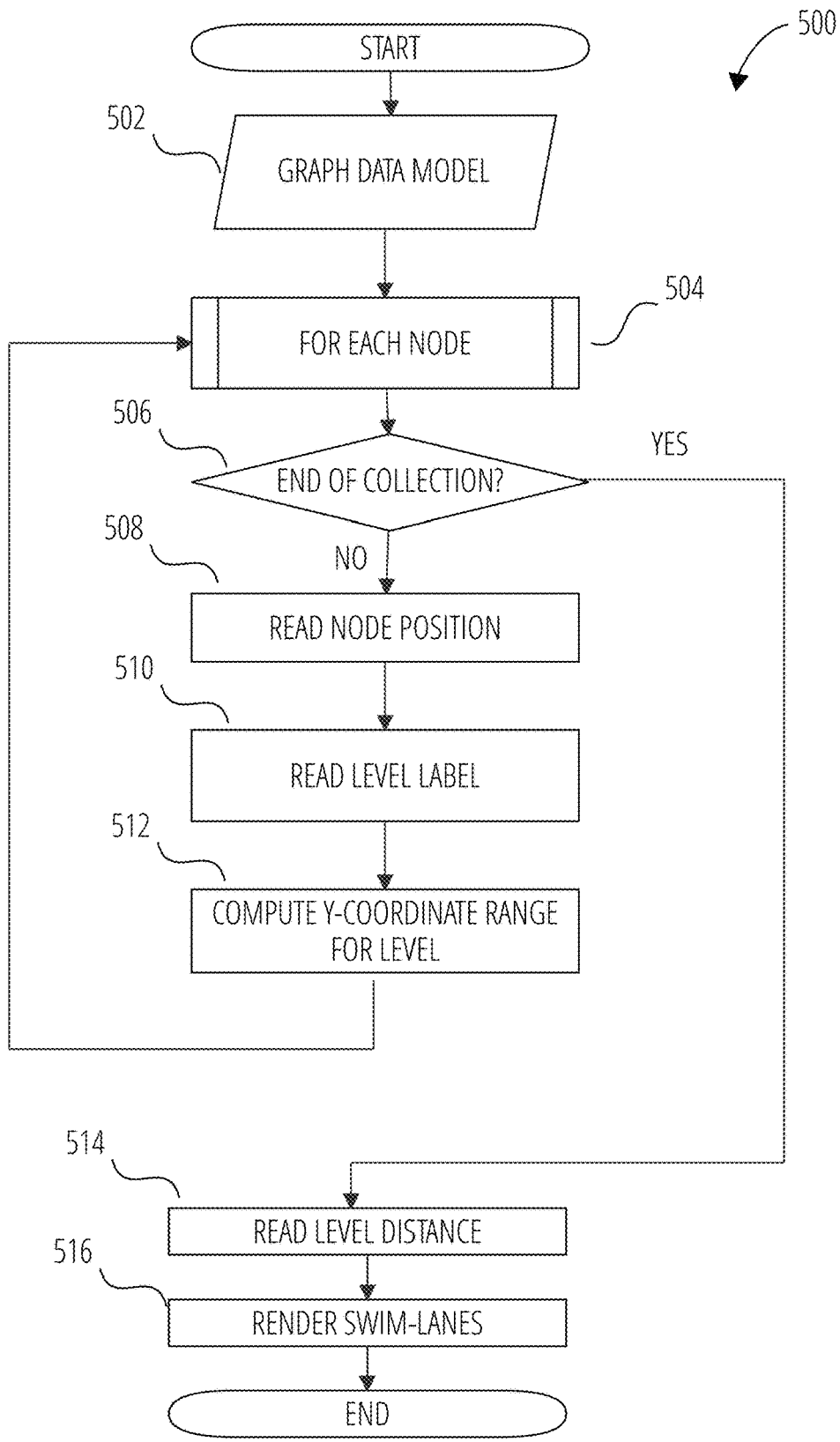
FIG. 5 illustrates a flowchart 500 for creating swim lanes in accordance with one embodiment of network visualization.

FIG. 5 illustrates a flowchart 500 for creating one or more swim lanes in accordance with one embodiment of network visualization. The graph data model 502 provides a list of nodes as in FIG. 4. As each node 504 is processed sequentially, the node position 508 is read, and then the level label 510 is read. The node position 508 and level label 510 are then used to compute a Y-coordinate range for level 512. Once every node is processed (i.e. the end of the collection 506 of nodes is reached), a level distance 514 is computed, which is then used to generate 516. In summary, a user provides labels for one or more swim lanes. Nodes and edges are already displayed on a canvas, and the swim lanes are placed in the background of the nodes and edges.

Figure 6:
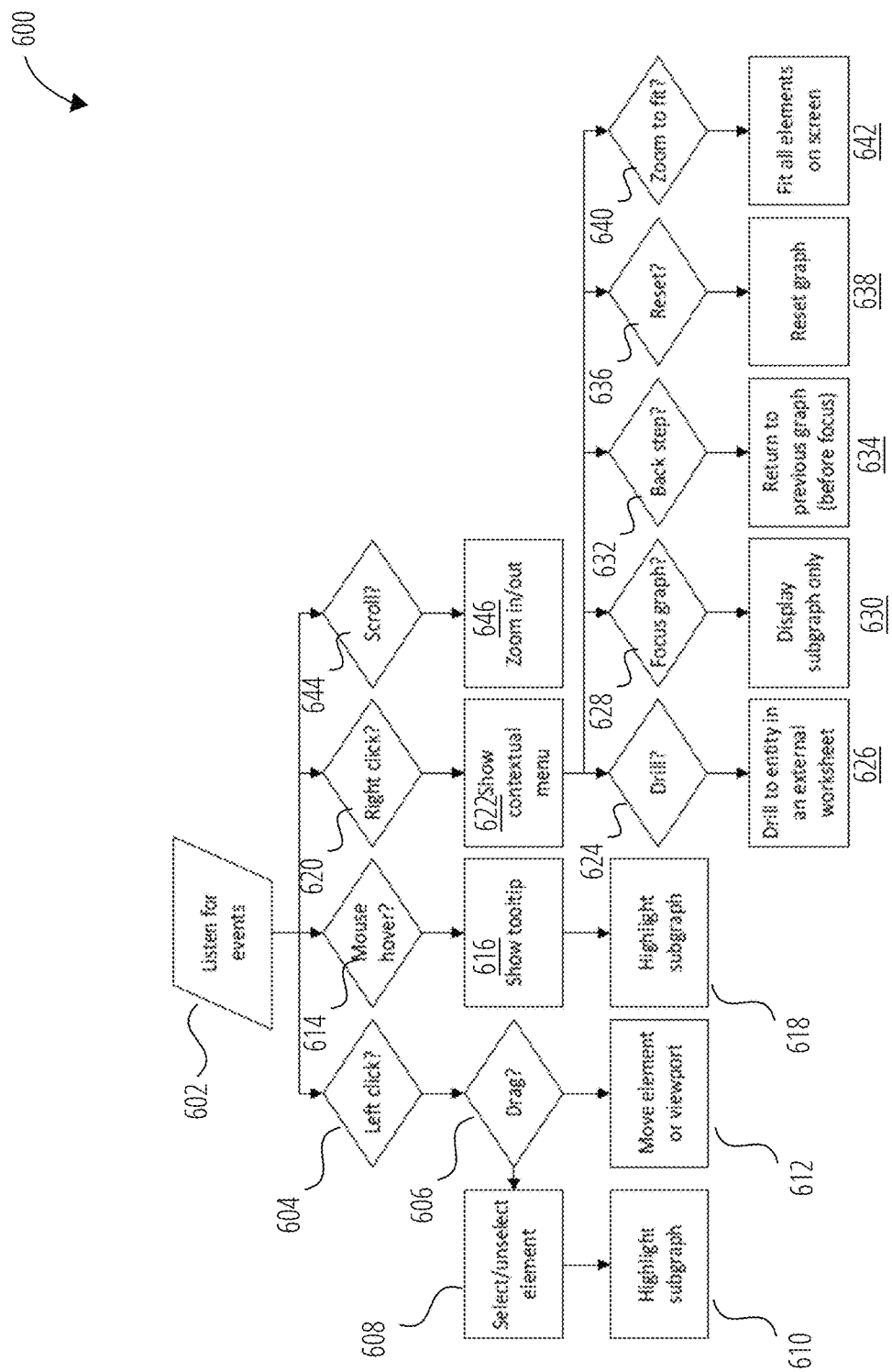
FIG. 6 illustrates a flowchart 600 for event listening in accordance with one embodiment of network visualization.

FIG. 6 illustrates a flowchart 600 for event listening in accordance with one embodiment of network visualization. In FIG. 6, a user interacts with the network visualization via a user interface (not shown). In such an interaction, the worksheet data remains unchanged; however, the network state and the visualization viewport are updated according to the user's actions.

A number of events can occur during the course of the interaction, as the first step is for the system to listen for events 602. While four events are shown, it is understood that there may be fewer or more. For example, the four events listed are: left click 604 of a mouse, mouse hover 614, right click 620 of a mouse and scroll 644 of a mouse. Each event can proceed onto its own sequence of successive events as the user interacts with the visualization on the canvas.

A left click 604 of the mouse launches an opportunity to either select/unselect element 608 or drag 606 the mouse, thereby having the mouse move an element or the viewport 612. Where an element is selected, it can be used to highlight a subgraph 610 in which all nodes directly connected to the selected node, are highlighted. Where an element is moved, it is understood that while a node can be moved, an edge cannot be moved independently of the nodes to which it is attached.

A mouse hover 614 over an element will proceed to show tooltip 616, and highlight a subgraph 618 associated with the element. The tooltip allows for showing of further details of a node or an edge.

A right click 620 of the mouse can show a contextual menu 622, in which actions can be provided for further analysis of the visualization. For example, there can be a further drill 624 of an element which can drill to an entity in an external worksheet 626. That is, "drilling" is akin to accessing a hyper link, which provides further details of the element in question.

Another item in the menu can be to provide a focus graph 628, in which the visualization can display a subgraph only 630. Highlighting a subgraph is defined as highlighting all the predecessors and successors of the selected node, while all the other nodes fade. This allows the user to focus on the graph path (sequence of nodes and links) of interest. The successors and predecessors path represents all the nodes the selected node depends on, together with all the nodes which depend on the selected node (e.g. Parents, parents of parents, etc., Children, children of children, etc.).

Another item in the menu can be to back step 632, and return to previous graph (before a focus) 634. Another item in the menu can be to reset 636, in which a reset graph 638 is performed. Another item in the menu can be to zoom to fit 640, by which the visualization can fit all elements to screen 642.

Finally, a mouse scroll 644 can zoom in/out 646 of the visualization.

While a mouse is shown as an instrument used for user interaction in FIG. 6, other instruments of user interaction can be used. Non-limiting examples include a user's one or more fingers and a digital pen.

The visualization framework lets the user pick a data column of its choice for each generic network mapping.

Figure 7:
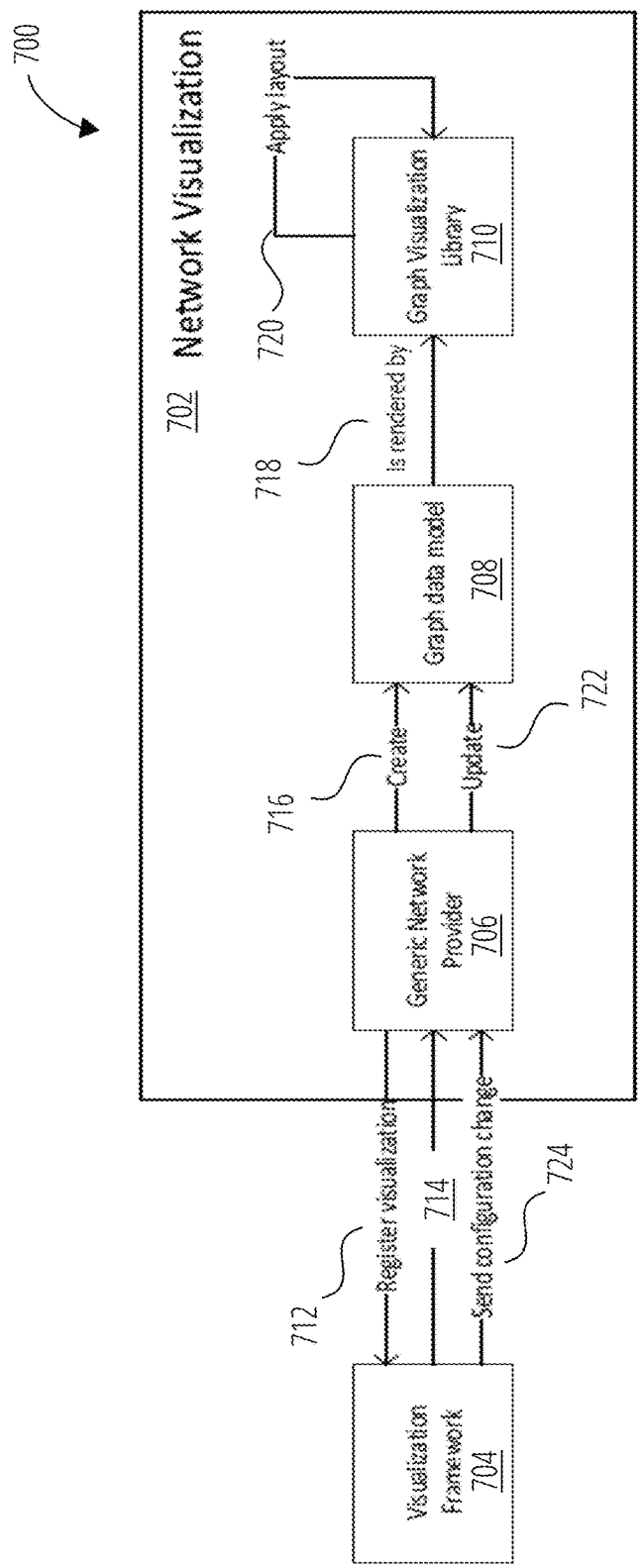
FIG. 7 illustrates a system architecture in accordance with one embodiment of network visualization.

FIG. 7 illustrates a system architecture 700 in accordance with one embodiment of network visualization 702.

As a first step, network visualization 702 registers itself (visualization 712) with a visualization framework 704. The visualization framework 704 is a component of a larger application that is connected to a server and/or database.

Registration of the visualization renders the visualization framework 704 aware of the visualization. In this manner, the visualization framework 704 knows what the data requirements for the visualization are, and allows a user to select a visualization only if a worksheet that the user is viewing is compatible with the data requirements of the visualization. For example, a network visualization requires at minimum two text columns (i.e. one column for a parent and one column for a child). The visualization framework 704 will therefore suggest the network visualization for worksheets that have at least two text columns, but not for worksheets that have only number columns.

Once registration is complete, the visualization framework 704 sends send data 714 to a network provider 706, which then create 716 a graph data model 708 based on the data. The graph data model 708 is rendered by 718 a graph visualization library 710 that applies a layout 720 (i.e. Positioning of nodes and edges).

If a user interacts with the system and chooses to change the columns that are mapped onto the visualization, then there is a configuration change 724 sent from the visualization framework 704 to the network provider 706. The visualization framework 704 sends new data to the network visualization 702 whenever a new column is mapped, an existing column is unmapped, or a mapping is replaced with another column. Moreover, the visualization framework 704 allows the user to configure options for each mapping. Non-limiting examples of such options include gradient direction, gradient colors, node spacing, node size, etc.

The network provider 706 then updates 722 the graph data model 708 to reflect the new mapping(s), which is then rendered by 718 by the graph visualization library 710 that applies a layout 720.

Figure 8:
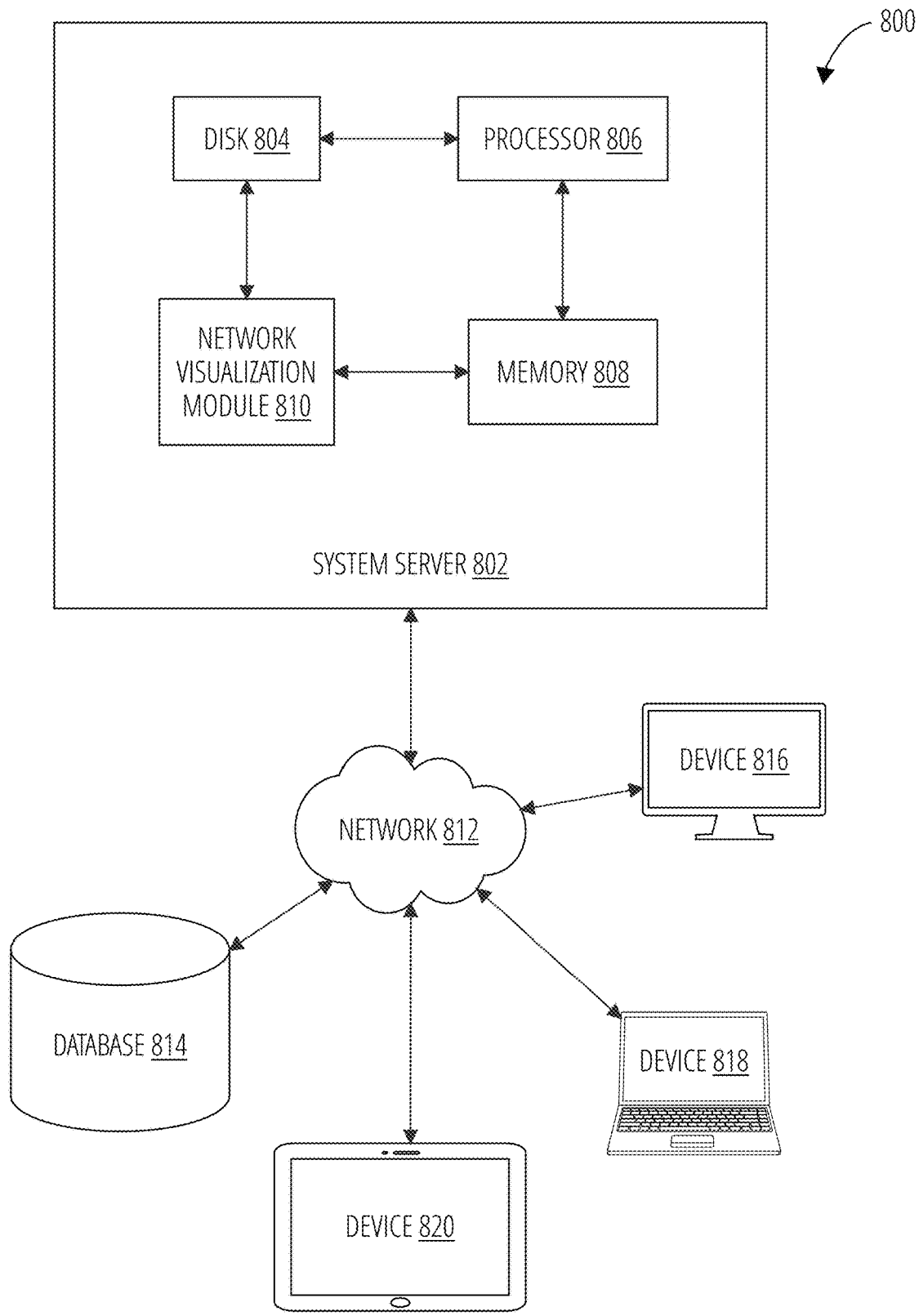
FIG. 8 illustrates a block diagram in accordance with one embodiment.

FIG. 8 illustrates a system 800 in accordance with one embodiment of a network visualization.

System 800 includes a system server 802, database 814 and one or more devices (for example, device 816, device 818, device 820, etc.).

System server 802 can include a memory 808, a disk 804, a processor 806 and a visual network visualization module 810. While one processor 806 is shown, the system server 802 can comprise one or more processors. In some embodiments, memory 808 can be volatile memory, compared with disk 804 which can be non-volatile memory. In some embodiments, system server 802 can communicate with database 814 and the one or more devices via network 812. While database 814 is illustrated as separate from system server 802, database 814 can also be integrated into system server 802, either as a separate component within system server 802, or as part of at least one of memory 808 and disk 804.

System 800 can also include additional features and/or functionality. For example, system 800 can also include additional storage (removable and/or non-removable) including, but not limited to, magnetic or optical disks or tape. Such additional storage is illustrated in FIG. 8 by memory 808 and disk 804. Storage media can include volatile and nonvolatile, removable and non-removable media implemented in any method or technology for storage of information such as computer-readable instructions, data structures, program modules or other data. Memory 808 and disk 804 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 800. Any such non-transitory computer-readable storage media can be part of system 800.

Communication between system server 802, database 814 and the one or more devices via network 812 can be over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 800 may take place over hard-wired, cellular, Wi-Fi or Bluetooth networked components or the like. In some embodiments, one or more devices of system 800 may include cloud-based features, such as cloud-based memory storage.

Memory 808 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Database 814 may store metadata regarding the structure, relationships and meaning of data. This information may include data defining the schema of database tables stored within the data. A database table schema may specify the name of the database table, columns of the database table, the data type associated with each column, and other information associated with the database table. Database 814 may also or alternatively support multi-tenancy by providing multiple logical database systems which are programmatically isolated from one another. Moreover, the data may be indexed and/or selectively replicated in an index to allow fast searching and retrieval thereof.

Database 814 may provide a variety of raw data from the user, including, but not limited to: point of sales data that indicates the sales record of all of the client's products at every location; the inventory history of all of the client's products at every location; promotional campaign details for all products at all locations, and events that are important/relevant for sales of a client's product at every location.

Using network 812, system server 802 can retrieve data from database 102. The retrieved data can be saved in memory 808 or disk 804. In some cases, system server 802 can also comprise a web server, and can format resources into a format suitable to be displayed on a web browser.

Figure 9:
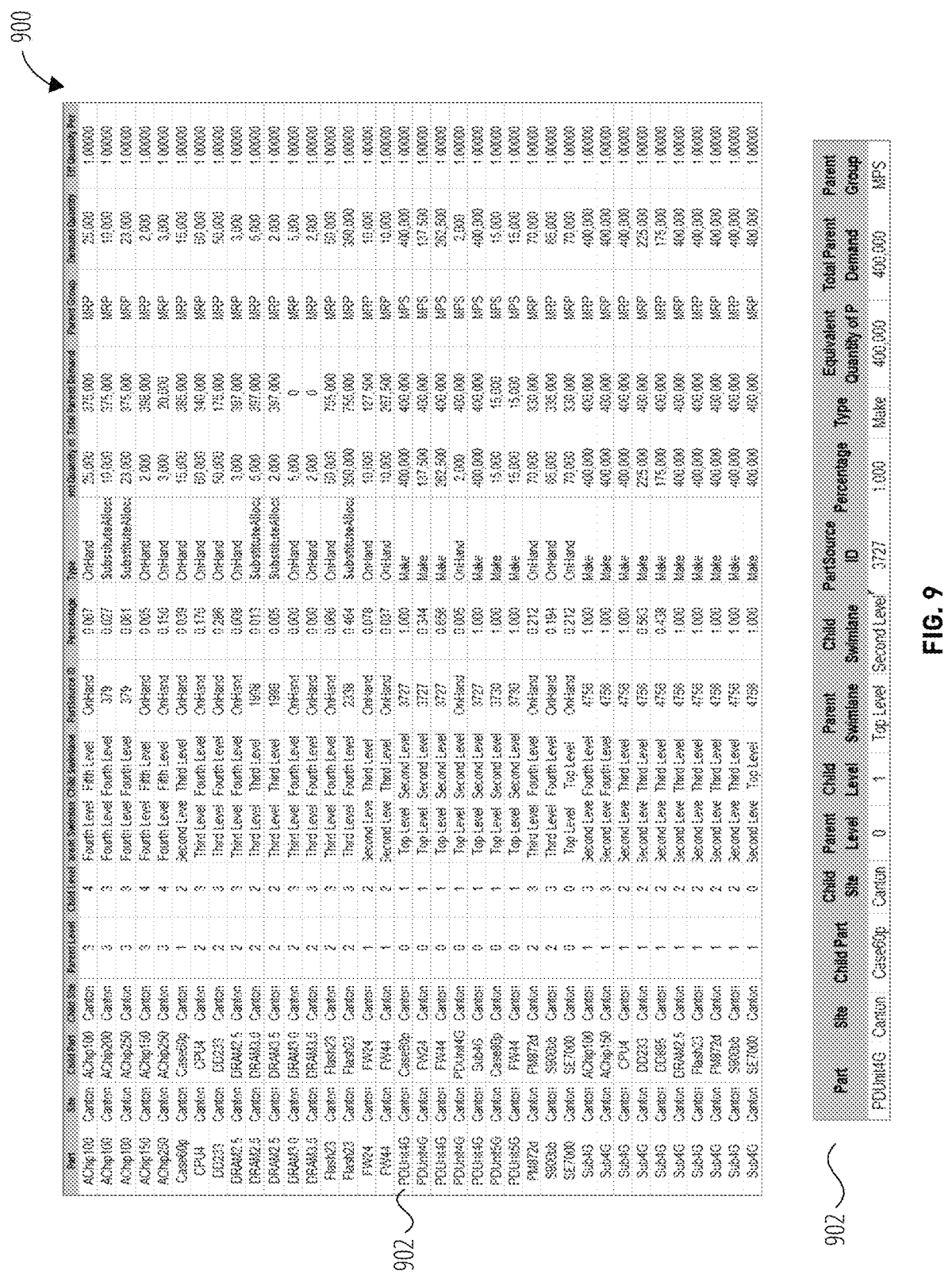

FIG. 9 illustrates an example data table 900 in accordance with one embodiment of network visualization. Example data table 900 provides information of various entities in a supply chain. Example 902 is shown, enlarged, in which a Part, identified as "PDUnit4G" is at a Site identified as "Canton". A Child Part to this Part, is identified a "Case60p", with a Child Site identified as "Canton". The Parent Level is set as '0', while the Child Level is set to '1'. For this data table, there are swim lanes designated for the Parent and the Child. In example 902, the Parent Swim Lane is labelled 'Top Level', while the Child Swim Lane is labelled 'Second Level'. The Parent Group is identified as 'MPS' for example 902. Other identifying features (Part-Source ID, Percentage, Type, Equivalent Quantity of Parent, Total Parent Demand) are also provided.

Figure 10:
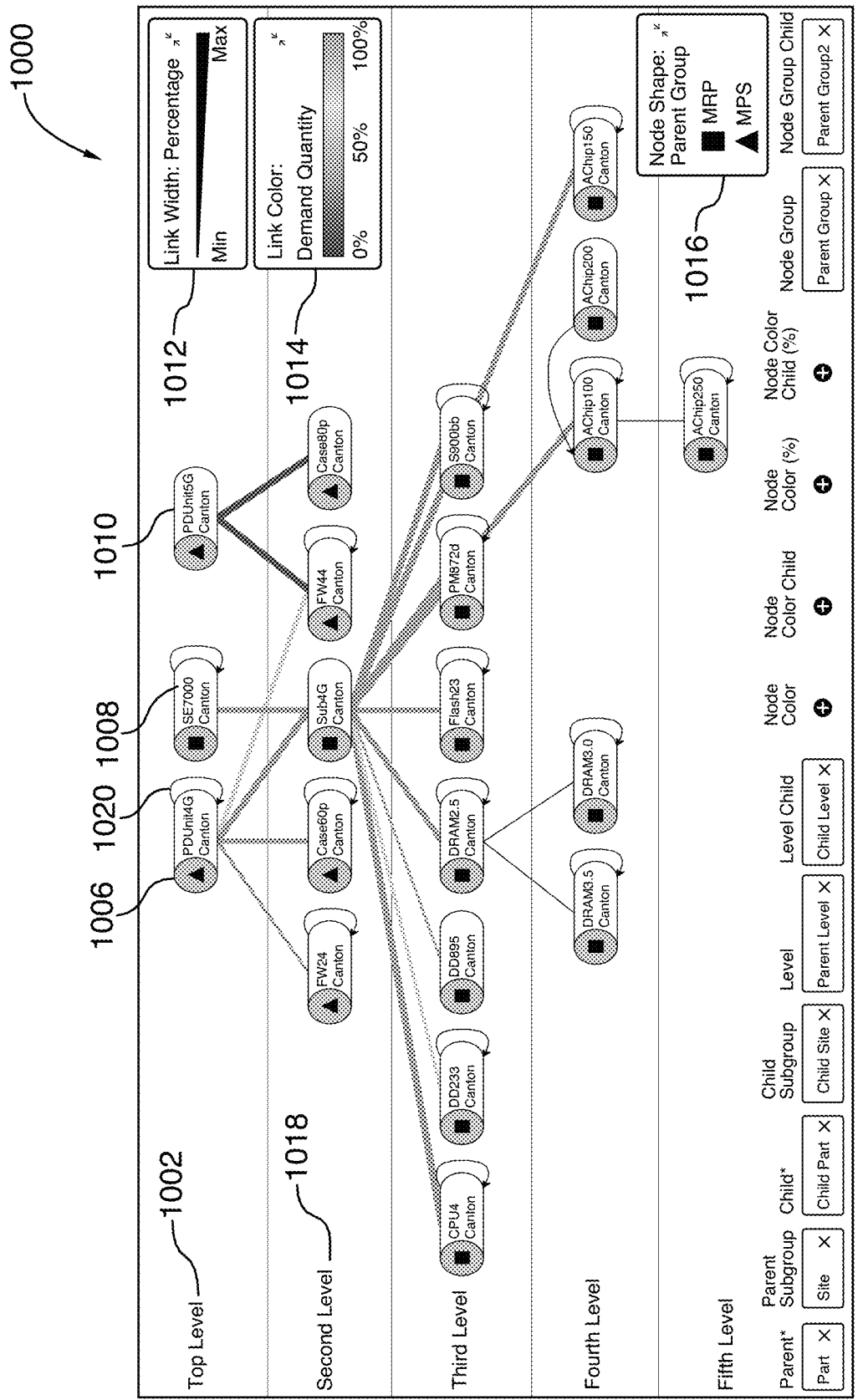
FIG. 10 illustrates an example of network visualization, based on the data table shown in FIG. 9, in accordance with one embodiment.

FIG. 10 illustrates an example of network visualization 1000, based on the data table shown in FIG. 9, in accordance with one embodiment. Original example data table 900 (in FIG. 9) is converted into a network visualization 1000, in which parent-child relationships are readily ascertained, as are the various attributes and connections.

For example, all of the parent parts identified at level '0' in example data table 900 are all in the top level swim lane 1002. Specifically, parent 1006 (PDUnit4G), parent 1008 (SE7000) and parent 1010 (PDUnit5G) are shown in top level swim lane 1002. Each parent is identified by its parent group attribute, as either 'MRP' or 'MPS', as shown in the node shape categorical legend 1016.

The parent-child link is also shown in network visualization 1000. For example, parent 1006 (PDUnit4G) has five links shown in FIG. 9: Case60p, FW24, FW44, Sub4G, and PDUnit4G (itself). Self-link 1020 indicates that there is a link between parent 1006 to itself. The four child links of parent 1006, Case60p, FW24, FW44 and Sub4G, are all in the second level swim lane 1018. The link between parent 1006 and each child is augmented by two attributes, represented by the thickness and color of each edge.

For example, according to example data table 900 (in FIG. 9), the percentage KPI pertaining to the links from parent PDUnit4G to each of the five children, is listed in the column headed by the title 'percentage'. The numerical values are converted to a visual attribute that readily conveys the strength of each link in network visualization 1000 by the thickness of each link, as shown in the link width quantitative legend 1012. For example, parent 1006 (PDUnit4G) has a 100% link to each of children Case60p and Sub4G (according to example data table 900). Therefore, the thickness of the link between PDUnit4G and Case60p, and the link between PDUnit4G and Sub4G are equal. According to example data table 900, PDUnit4G has a 34.4% link to child FW24, and a 65.6% link to child FW24. Therefore, these links are less in thickness, as shown in network visualization 1000; the thickness being proportional to the percentage. Finally, PDUnit4G has a 0.5% link to itself, as shown by self-link 1020.

The color of the link (or shading, in the black and white network visualization 1000) reflects the demand quantity attribute 1014 (as listed in the demand quantity column of example data table 900 in FIG. 9). For example, the demand quantity of both Case60p and Sub4G is 400,000, whereas that of FW44 is 262,500 and that of FW24 is 137,500. These values are reflected as a percentage of the maximum demand quantity (which is 400,000 as listed in the total parent demand column of example data table 900 in FIG. 9), according to the shading key of demand quantity attribute 1014.

In summary, the complex relationships listed in example data table 900 (of FIG. 9) are rendered into the form of network visualization 1000, thereby providing a quick, visual analysis of the relationships between parent and child entities for a user. This avoids lengthy analysis, by the user, of example data table 900.

FIG. 11 illustrates an example of features 1100 in accordance with one embodiment of network visualization. The listed features and respective descriptions, are examples of what can be provided by a visualization network as shown, for example in FIG. 10.

Figure 12:
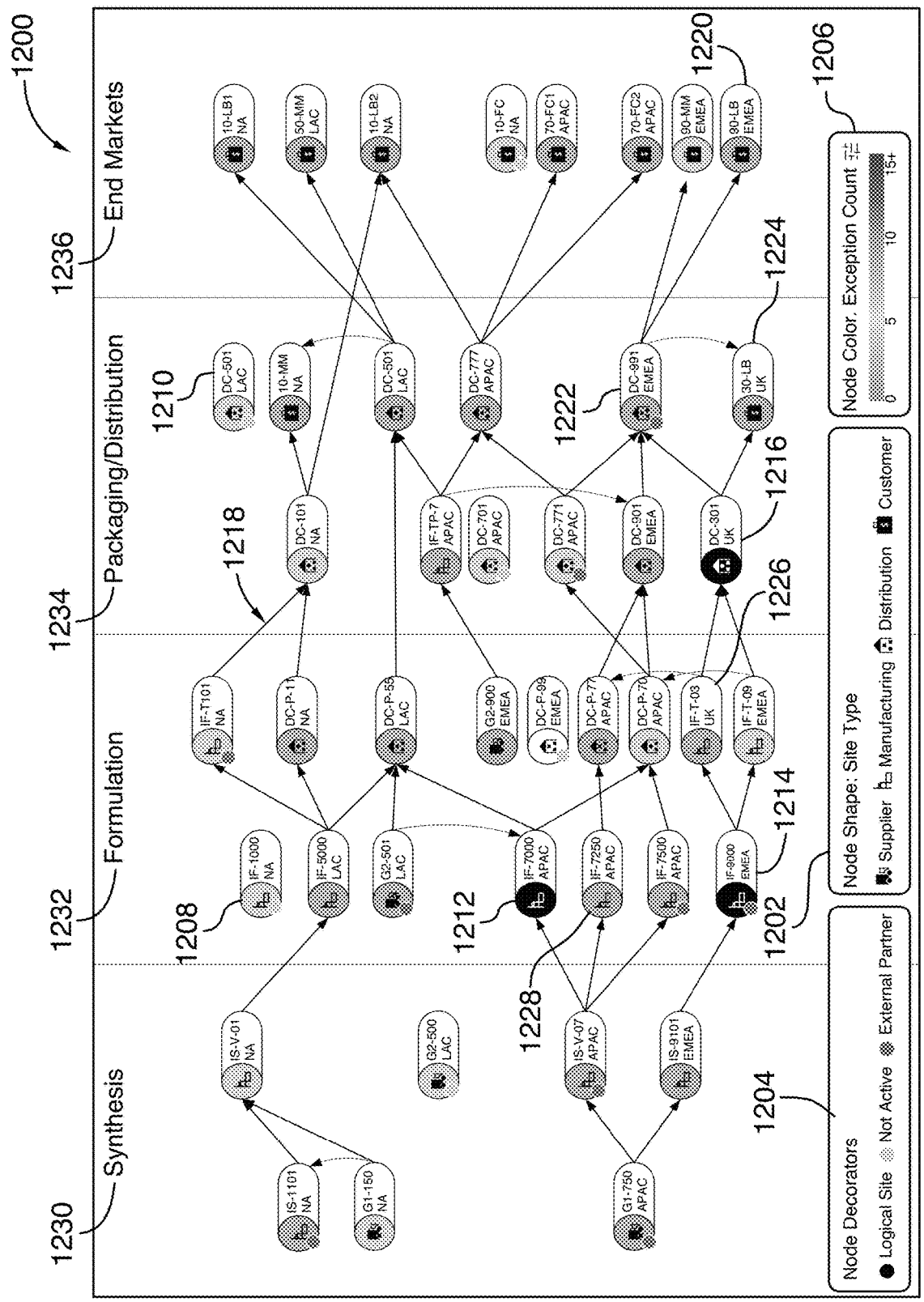
FIG. 12 illustrates an example of network visualization 1200 in accordance with one embodiment.

FIG. 12 illustrates an example of network visualization 1200 in accordance with one embodiment. In this example, a network visualization provides information about (Key Performance Indicators) KPIs in a pharmaceutical supply chain.

Node types 1202 indicate that there are four node types in this visualization: supplier, manufacturing, distribution and customer. Further descriptors 1204 indicate whether some nodes are: a logical site, not active or an external partner. Inactive nodes have no connections with other nodes (i.e. no edges). Node 1208 and node 1210 are each examples of an inactive node. In addition, the visualization indicates four swim lanes: synthesis 1230, formulation 1232, packaging/distribution 1234 and end markets 1236. The supply chain proceeds from synthesis to end markets. Line thickness indicates volume/KPI (line thickness 1218) between two nodes.

While the visualization is originally in color, as indicated by node color key 1206, the different gray shades shown in FIG. 12 indicate whether there are issues at any particular node, with the darkest shade (originally red) reserved for points in the chain where the KPI indicates one or problems in the supply. That is, colors represent the KPIs. In FIG. 12, the nodes are one of five distinct color: grey (indicating an inactive node), green (excellent KPI), yellow (good KPI), orange (sub-par KPI) and red (underperforming KPI). The colors translate into increasing darkness in the shade of gray. In FIG. 12, there are three nodes that have KPIs which indicate a problem (and are coded as red—or very dark grey): node 1212, node 1214 and node 1216. In FIG. 12, there are five nodes that have KPIs which indicate sub-par performance (and are coded as orange—or dark grey): node 1220, node 1222, node 1224, node 1226 and node 1228. The remaining nodes in FIG. 12 have good or excellent KPIs. With the visualization shown in FIG. 12, the root cause of an issue can be quickly identified.

For example, beginning at the end of the supply chain, in the swim lane end markets 1236, node 1220 is quickly identified as having a sub-par KPI (it is coded orange, whereas the remaining nodes in the swim lane end markets 1236 are all coded as green or yellow, indicating acceptable KPIs). Working backwards from node 1220, there is a problematic KPI in the swim lane packaging/distribution 1234 at node 1222 (which is color coded orange). Node 1222 is connected to node 1224 which is also problematic. Working backwards from node 1224, we see that node 1216 (coded red) is connected to node 1224. Working backwards from node 1216, one is led quickly to node 1214 which indicates the root cause of the problem, which is manufacturing site identified as "IF-9000 EMEA" where formulation takes place. In addition, FIG. 12 indicates that there is another issue at node 1212 (coded red) which is also a manufacturing site with identifier "IF-7000 APAC".

Figure 13:
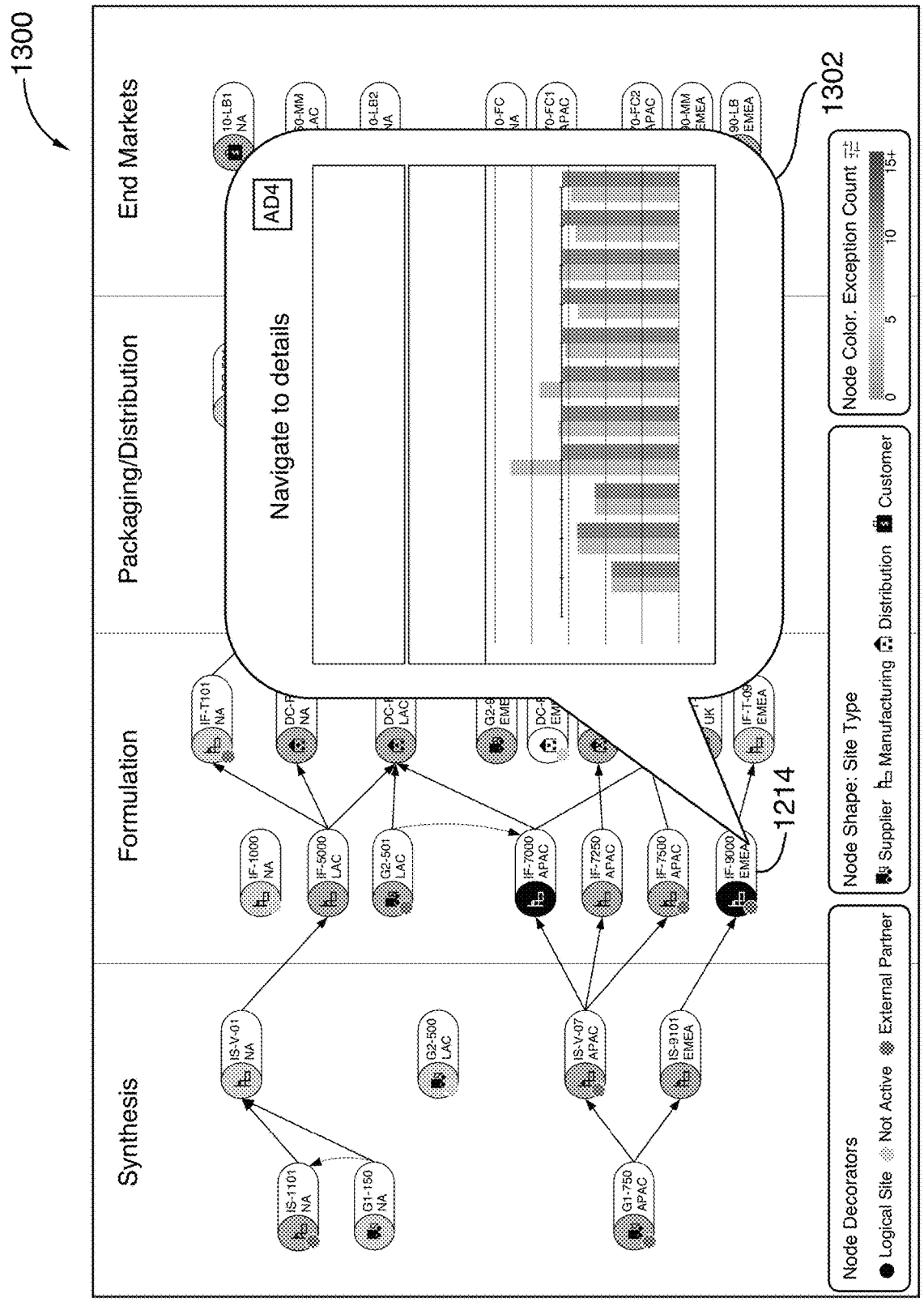
FIG. 13 illustrates further details 1300 of the embodiment shown in FIG. 12.

FIG. 13 illustrates further details 1300 of the embodiment shown in FIG. 12. The root cause at node 1214 can be further examined by drilling into node 1214, revealing further details 1302 of node 1214, which can be used to further isolate and address the root cause of the underperforming KPIs.

Figure 14:
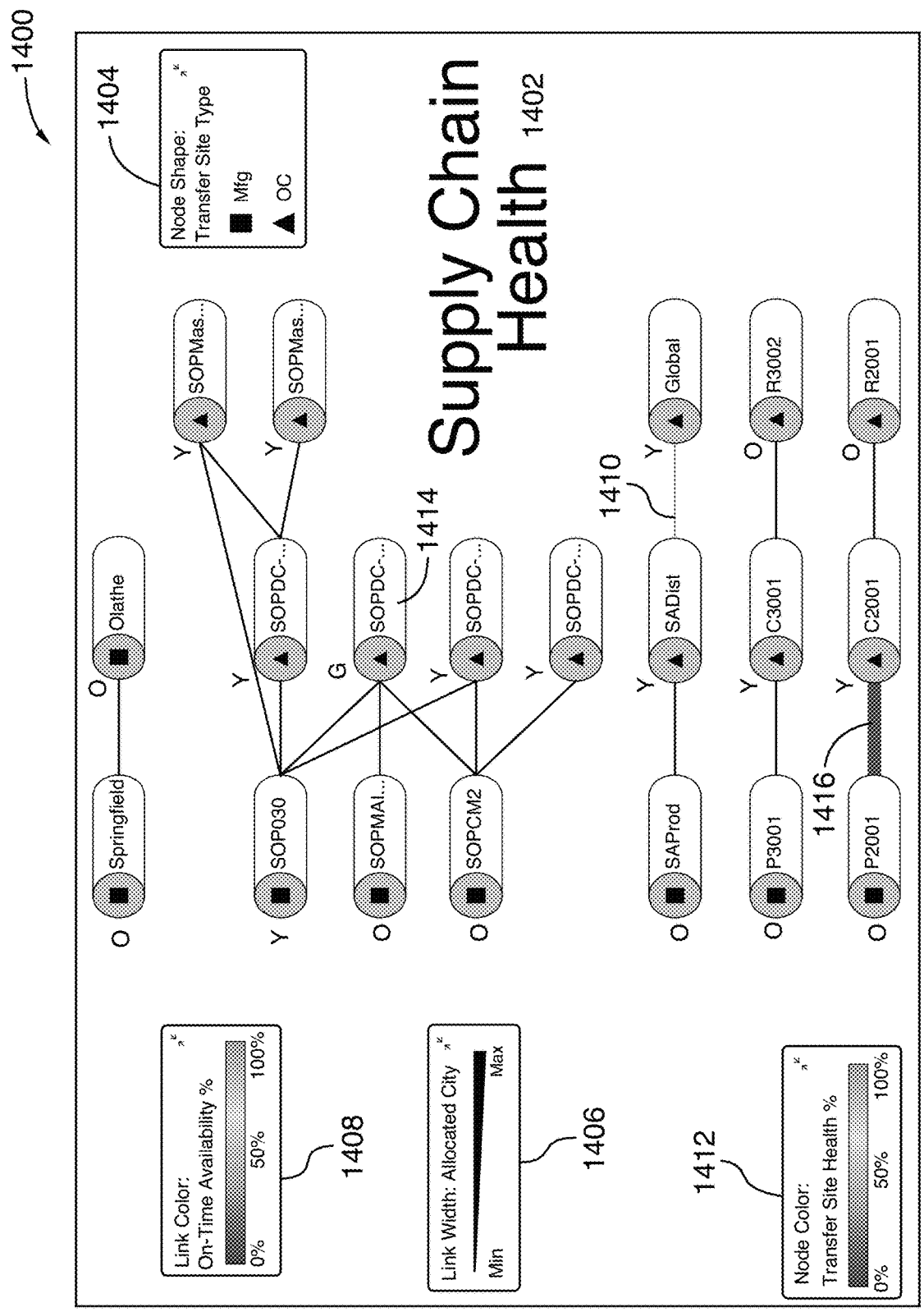
FIG. 14 illustrates an example of network visualization in accordance with one embodiment.

FIG. 14 illustrates an example of network visualization 1400 in accordance with one embodiment. In this example, network visualization 1402 of the health of a supply chain is provided. In FIG. 14, there are no swim lanes in the visualization. In FIG. 14, there are two types of nodes, according to the node key 1404: Mfg (square) and DC (triangle). The width of each edge reflects an allocated quantity (according to link width key 1406).

The link color key 1408 indicates the percentage of on-time availability, with the lowest (0%) reflected as dark grey (red in the original visualization) and the highest (100%) reflected as light grey (green in the original visualization). In the full color version of the visualization, all of the links are red (i.e. dark grey), except for link 1410 which is green (i.e. light grey). This indicates that all of the points in the supply chain are late, except for link 1410. Link 1416, which is red (i.e. dark grey) and has maximum thickness, is quickly identified as a trouble spot in the supply chain.

The node color key 1412 reflects the health of the transfer site in terms of percentages, with the lowest (0%) reflected as dark grey (red in the original visualization) and the highest (100%) reflected as light grey (green in the original visualization). In the full color version of the visualization, nine of the nodes are orange (marked with an 'O'), indicative of a health around 50%); ten nodes are yellow (marked with a 'Y'), indicative of a health around 75%; and one node (node 1414) that is green (marked with a 'G'), indicative of a health of 100%.

Figure 15:
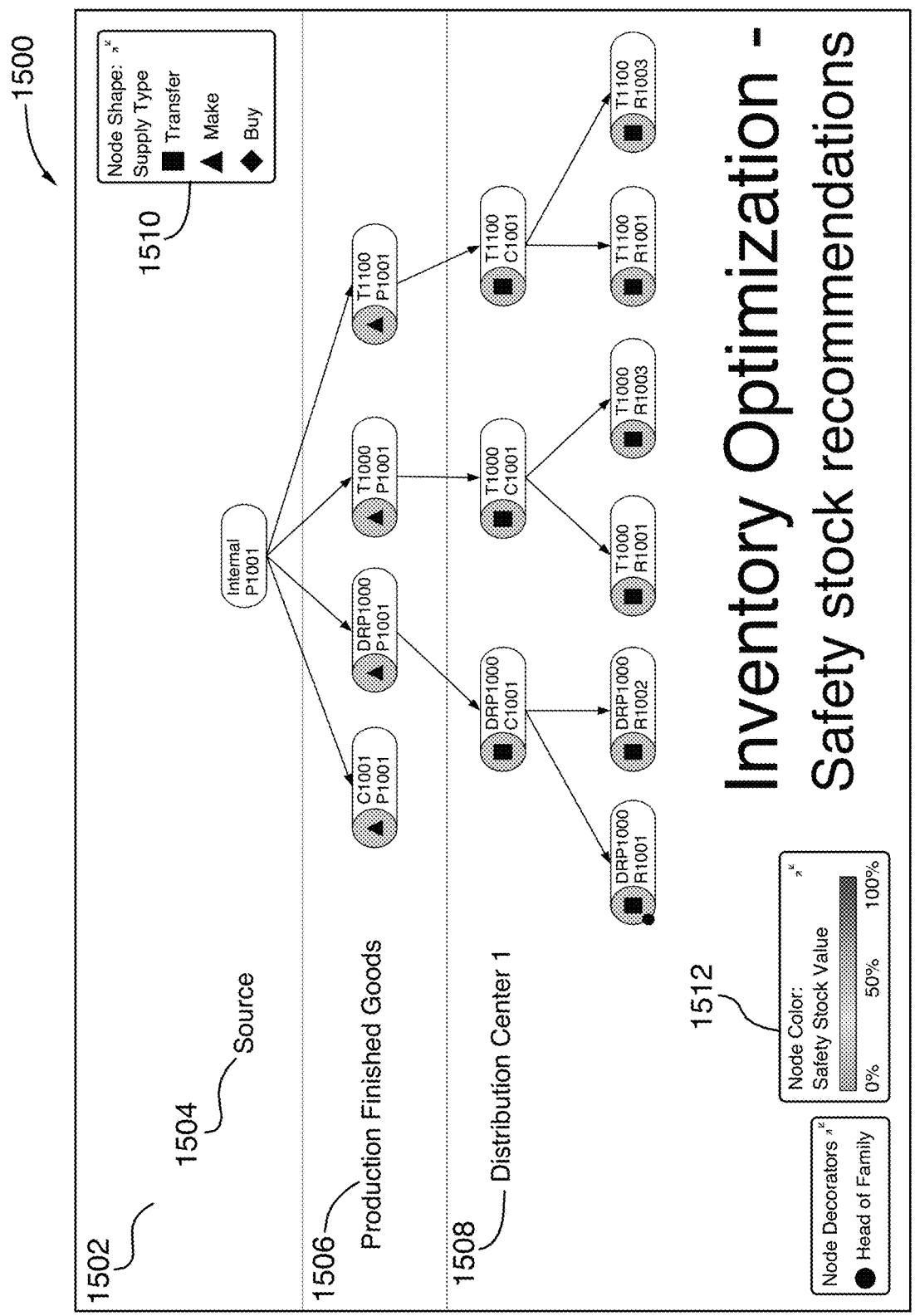
FIG. 15 illustrates an example of network visualization in accordance with one embodiment.

FIG. 15 illustrates an example of network visualization 1500 in accordance with one embodiment. In this example, network visualization 1502 of inventory optimization is provided, including safety stock recommendations.

In the network visualization 1502, there are three swim lanes: Source 1504, Production Finished Goods 1506 and Distribution Center 1 1508. There are three supply types, represented by node shapes, as shown in the node key 1510: transfer (square), make (triangle) and buy (diamond). As there are no attributes associated with the edges that link the nodes, there is no variation in link thickness or color. The node color key 1512 indicates a safety stock value at any given node. In the original visualization in full color, all of the nodes are of the same color, indicative of roughly 0% at each node.

In the swim lane Source 1504, there is an internal node that has no identification as a supply type. This node provides stock further down the chain. In swim lane Production Finished Goods 1506, all of the nodes are marked as 'make' or manufacturing. In swim lane Distribution Center 1 1508, all of the nodes are identified as transfer nodes.

Figure 16:
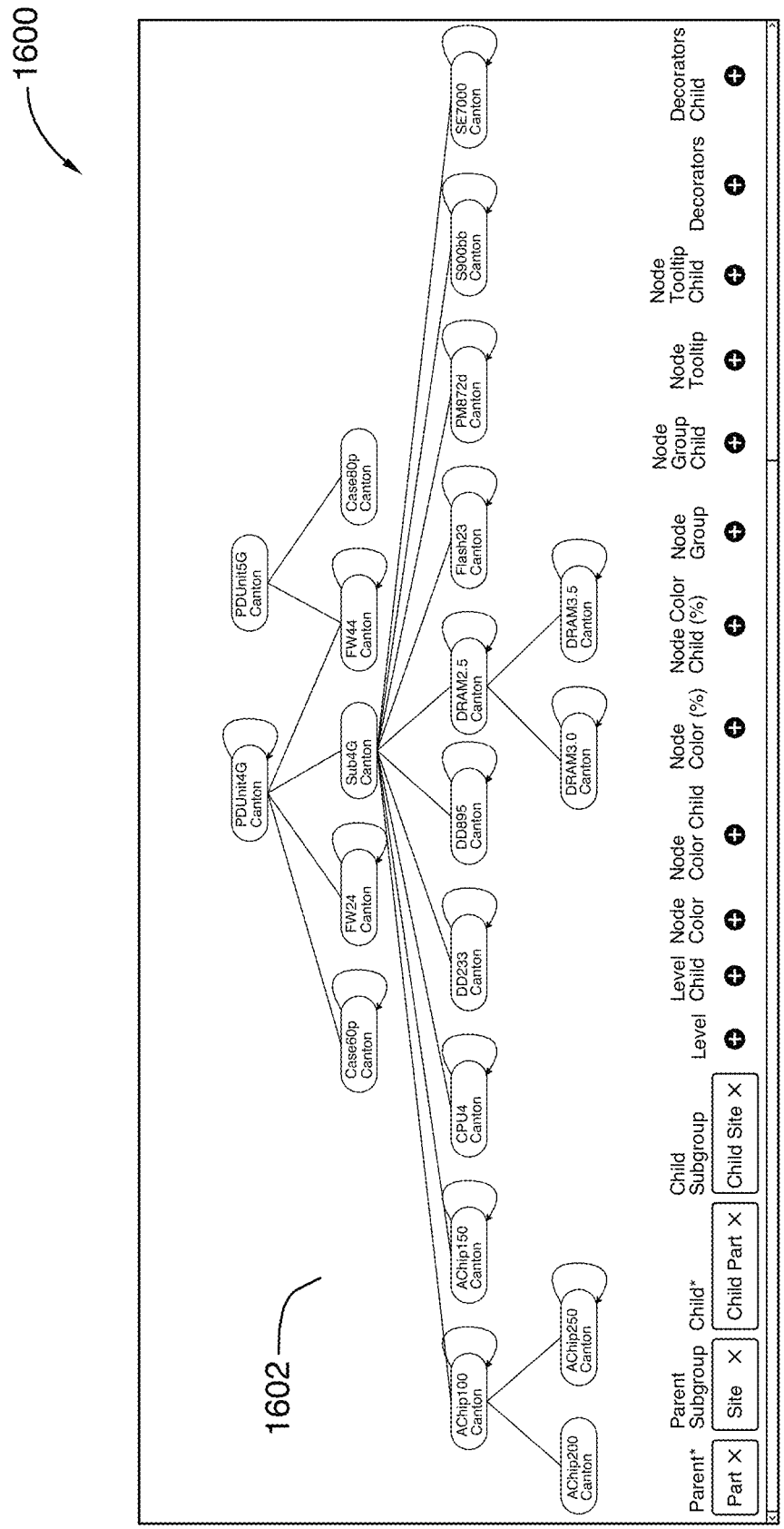
FIG. 16 illustrates an example of network visualization in accordance with one embodiment.

FIG. 16 illustrates an example of network visualization 1600 in accordance with one embodiment. In network visualization 1602, there is provided an example of a network structure with a single optional qualitative mapping (node group). Therefore, there are no color coded links or nodes, as there is no quantitative or qualitative mappings present.

Figure 17:
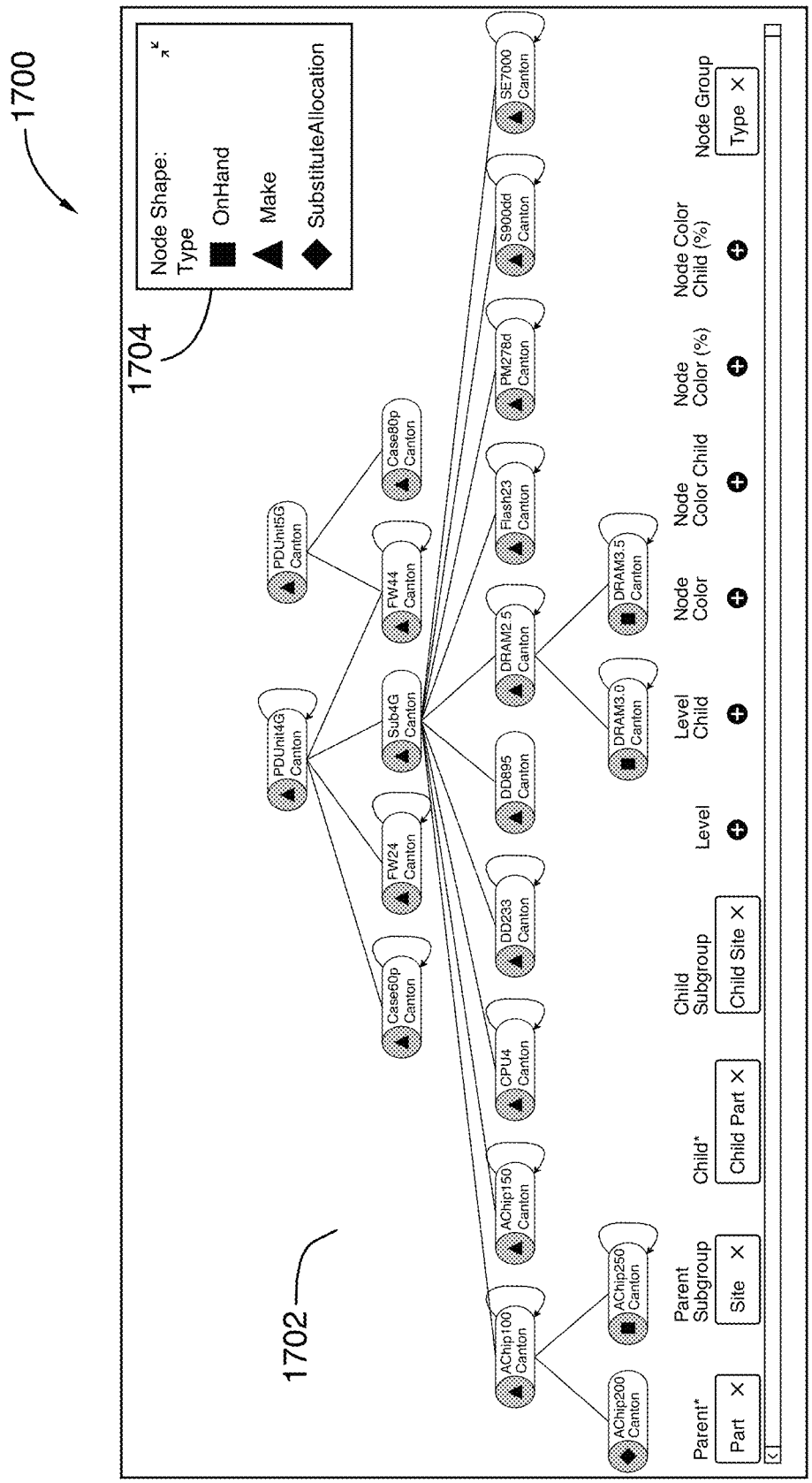
FIG. 17 illustrates an example of network visualization in accordance with one embodiment.

FIG. 17 illustrates an example of network visualization 1700 in accordance with one embodiment. In network visualization 1702, there is provided an example of a network structure in which there is a single qualitative mapping (i.e. node group) and no quantitative mappings. Node shape legend 1704 indicates three different node types. Since there is no quantitative data, there are no color codes indicating numerical values.

Figure 18:
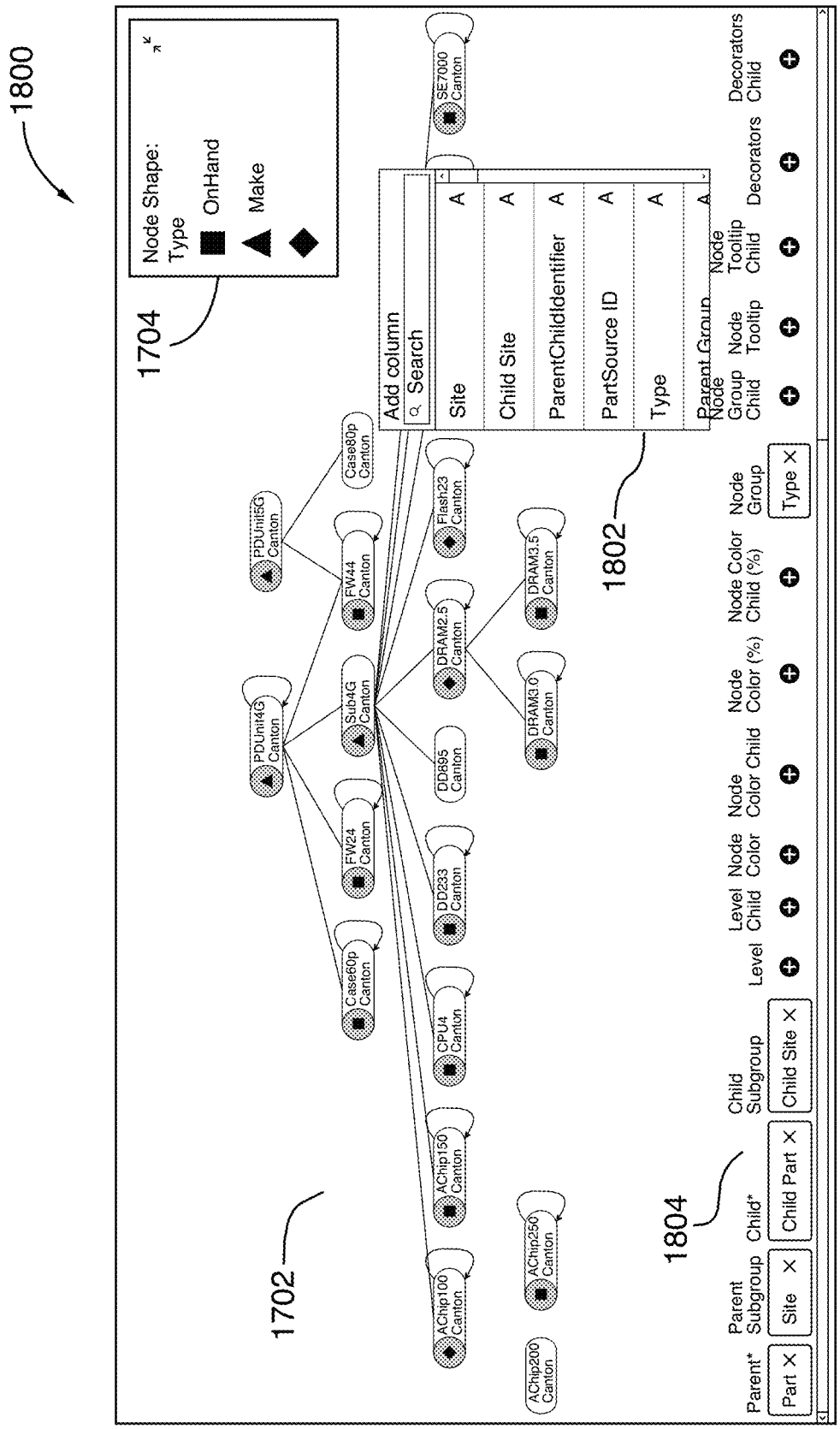
FIG. 18 illustrates an example of network visualization in accordance with the embodiment shown in FIG. 17.

FIG. 18 illustrates an example of network visualization 1800 in accordance with the embodiment shown in FIG. 17. The visualization framework allows a user to choose a data column for each network mapping. This screenshot shows how a user can pick a column for a specific mapping, using the drop-down menu 1802. A mapping chip 1804 illustrates the specific mapping in question.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network. As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices. The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU). Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive. Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry. To provide for interaction with a user, embodiments of the subject matter described herein can be implemented on a computer having a display device for displaying information to the user and input devices by which the user can provide input to the computer (e.g. a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser. Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN"). The computing system can include clients and servers. A client and server are generally remote from each other and typically interact through a communication network. The relationship of client and server arises by virtue of computer programs running on the respective computers and having a client-server relationship to each other. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products. Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method for network visualization of data, the method comprising:
   (a) creating, by a processor, a graph data model of the data, the graph model including a plurality of nodes and relationships between the nodes;
   (b) creating, by the processor, one or more groups based on one or more qualitative data mappings;
   (c) creating, by the processor, one or more statistical summaries based on one or more quantitative data mappings;
   (d) computing, by the processor, visual representations of the one or more statistical summaries of the one or more quantitative mappings and the one or more groups of the one or more qualitative mappings;
   (e) establishing, by the processor, for each of the plurality of nodes, a node position based on the relationships between nodes and level constraints, and a plurality of edges indicating the relationships between the nodes, the plurality of node positions and the plurality of edges appended to the graph data model; and
   (f) rendering, by the processor, a graph visualization of the data based on the plurality of node positions and the plurality of edges, wherein each the plurality of nodes, or each of the edges, of the graph visualization is rendered to include a visual representation based on the visual representations to indicate a statistical summary of the statistical summaries of the one or more quantitative mappings or a one of the one or more groups the one or more qualitative mappings that is associated with the node or the edge.

2. The method of claim 1, further comprising:
   creating, by the processor a plurality of swim lanes based on the level constraints, one or more labels and a layout.

3. The method of claim 1, further comprising:
   altering the data by a user via a user interface, and repeating steps (a) through (f).

4. The method of claim 1, further comprising customization of mappings.

5. A system for network visualization of data, the system comprising:
   a processor; and
   a memory storing instructions that, when executed by the processor, configure the system to:
   (a) create, by the processor, a graph data model of the data, the graph model including a plurality of nodes and relationships between the nodes;
   (b) create, by the processor, one or more groups based on one or more qualitative data mappings;
   (c) create, by the processor, one or more statistical summaries based on one or more quantitative data mappings;
   (d) compute, by the processor, visual representations of the one or more statistical summaries of the one or more quantitative mappings and the one or more groups of the one or more qualitative mappings;
   (e) establish, by the processor, for each of the plurality of nodes, a node position based on the relationships between nodes and level constraints, and a plurality of edges indicating the relationships between the nodes, the plurality of node positions and the plurality of edges appended to the graph data model; and
   (f) render, by the processor, a graph visualization of the data based on the plurality of node positions and the plurality of edges, wherein each the plurality of nodes, or each of the edges, of the graph visualization is rendered to include a visual representation based on the visual representations to indicate a statistical summary of the statistical summaries of the one or more quantitative mappings or a one of the one or more groups the one or more qualitative mappings that is associated with the node or the edge.

6. The system of claim 5, wherein the instructions further configure the system to:
   create, by the processor, a plurality of swim lanes based on the level constraints, one or more labels and a layout.

7. The system of claim 5, wherein the instructions further configure the system to:
   in response to alteration of the data by a user via a user interface, repeat steps (a) through (f).

8. The system of claim 5, wherein the instructions further configure the system to:
   customize mappings.

9. A non-transitory computer-readable storage medium, the computer-readable storage medium including instructions that when executed by a computer, cause the computer to:
   (a) create, by a processor, a graph data model of data, the graph model including a plurality of nodes and relationships between the nodes;
   (b) create, by the processor, one or more groups based on one or more qualitative data mappings;
   (c) create, by the processor, one or more statistical summaries based on one or more quantitative data mappings;
   (d) compute, by the processor, visual representations of the one or more statistical summaries of the one or more quantitative mappings and the one or more groups of the one or more qualitative mappings;
   (e) establish, by the processor, for each of the plurality of nodes, a node position based on the relationships between nodes and level constraints, and a plurality of edges indicating the relationships between the nodes, the plurality of node positions and the plurality of edges appended to the graph data model; and
   (f) render, by the processor, a graph visualization of the data based on the plurality of node positions and the plurality of edges, wherein each the plurality of nodes, or each of the edges, of the graph visualization is rendered to include a visual representation based on the visual representations to indicate a statistical summary of the statistical summaries of the one or more quantitative mappings or a one of the one or more groups the one or more qualitative mappings that is associated with the node or the edge.

10. The computer-readable storage medium of claim 9, wherein the instructions further configure the computer to:
- create, by the processor, a plurality of swim lanes based on the level constraints, one or more labels and a layout.

11. The computer-readable storage medium of claim 9, wherein the instructions further configure the computer to:
- in response to alteration of the data by a user via a user interface, repeat steps (a) through (f).

12. The computer-readable storage medium of claim 9, wherein the instructions further configure the computer to customize mappings.

* * * * *